United States Patent [19]

Nelson

[11] 4,085,765
[45] Apr. 25, 1978

[54] PRESSURE RELIEF VALVE

[75] Inventor: Kris L. Nelson, North Attleboro, Mass.

[73] Assignee: Texas Instruments Incorporated, Dallas, Tex.

[21] Appl. No.: 682,545

[22] Filed: May 3, 1976

[51] Int. Cl.² .............................................. F16K 17/40
[52] U.S. Cl. .................................. 137/68 R; 137/79; 169/19; 220/89 A; 236/92 C
[58] Field of Search .................... 137/69, 68 R, 71, 79; 220/89 A; 222/83, 54; 169/19, 58; 239/309; 236/92 C

[56] References Cited

U.S. PATENT DOCUMENTS

| 2,301,318 | 11/1942 | Peo | 137/79 X |
| 3,155,271 | 11/1964 | Summers et al. | 220/89 A |
| 3,330,440 | 7/1967 | Summers et al. | 220/89 A |
| 3,464,585 | 9/1969 | Summers | 220/89 A |

*Primary Examiner*—Martin P. Schwadron
*Assistant Examiner*—Richard Gerard
*Attorney, Agent, or Firm*—John A. Haug; James P. McAndrews

[57] ABSTRACT

A one-shot pressure relief device which can be hermetically sealed comprising a housing with a port fitting for connecting to a pressure zone to be monitored, the fitting having a passage which leads into a central cavity within the housing from the top side. The cavity is divided and sealed into two portions by a thin metallic membrane fixedly mounted adjacent a snap-acting pressure disc member with a central aperture. A hollow puncture member is positioned in the bottom of the housing in axial registry with the center aperture of the snap-acting pressure disc so that upon an over pressure condition in the monitored zone, the disc will snap over center at a predetermined condition allowing the membrane to move likewise piercing itself on the puncture member thereby venting and relieving the over pressure condition.

7 Claims, 4 Drawing Figures

PRESSURE RELIEF VALVE

BACKGROUND AND SUMMARY OF INVENTION

This invention relates generally to pressure responsive devices and more particularly to one shot hermetically sealed pressure relief valves.

There has been a need for a pressure relief valve which can be very accurately calibrated. Prior art pressure relief valves involved the use of a valve member, a valve seat and a biasing means for holding the valve member in engagement with the valve seat. These relief valves have been acceptable for certain applications but lack the reliability and accuracy needed for certain precise applications such as in coolant systems for computers. Additionally, typical prior art relief valves are not hermetically sealed to provide high reliability and accuracy in all environments.

Accordingly it is an object of the present invention to provide an improved pressure relief valve.

It is another object of this invention to provide a pressure relief valve which can be hermetically sealed.

It is still another object of this invention to provide a pressure relief valve which is extremely accurate and reliable in operation.

It is yet another object of this invention to provide a pressure relief valve which is a one-shot device which can be easily calibrated.

It is still a further object of this invention to provide a pressure relief valve of simple construction which can be easily assembled. Other objects and features will be in part apparent and in part pointed out hereinafter.

Briefly, the pressure relief valve of this invention comprises a housing member with a port fitting which at one end connects to a pressure zone and at the other end leads into a central cavity or chamber within the housing. The central chamber is sealingly divided into a first or top portion and a second or bottom portion by a thin membrane fixedly secured within the housing around its perimeter. A snap-acting disc member with a central aperture therein is fixedly secured adjacent the membrane in the bottom portion of the chamber on the opposite side of the thin membrane from the port fitting. Secured in the bottom of the housing is a hollow piercing member which extends up into the bottom portion of the chamber in axial registry with the center aperture of the snap-acting disc.

The snap-acting disc member is calibrated to snap over center at a predetermined over pressure condition and is initially positioned in a concave upward position relative to the piercing member. Upon the occurrence of the over pressure condition, the disc snaps to an inverted dish-shaped configuration causing the piercing member to extend up through the central aperture in the disc. Due to the pressure on the membrane member, the membrane follows the disc, piercing itself on the piercing member to cause venting of the over pressure condition through the hollow piercing member.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
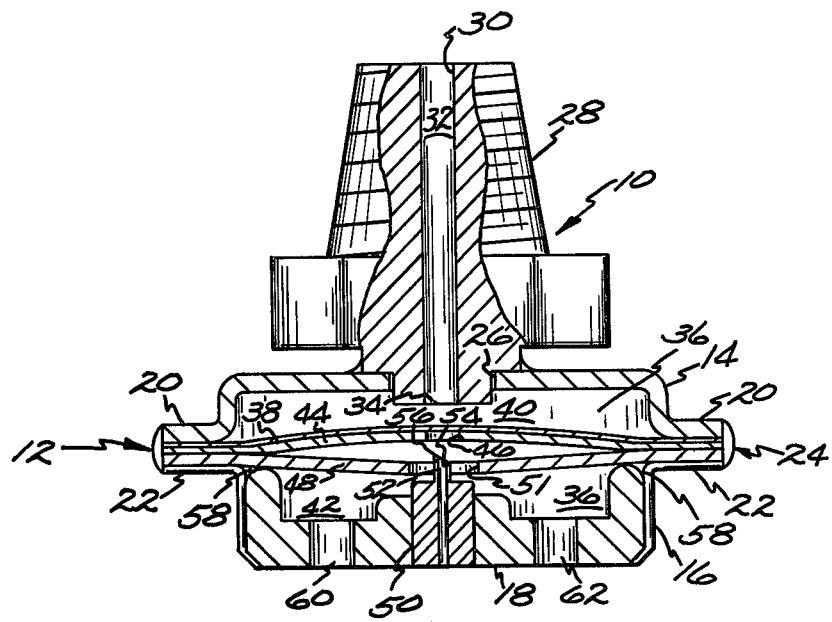
FIG. 1 is a cross-sectional view of a relief valve of this invention.

Referring to the drawings, 10 in FIG. 1 shows a relief valve of this invention. The valve 10 includes a housing 12 comprising an upper casing member 14, a lower casing member 16 and a bottom member 18. Upper casing member 14 and lower casing member 16 each have an outwardly extending flange portion 20 and 22 respectively and, when joined together as described below, form the main portion 24 of housing 12. Preferably main portion 24 of housing 12 is made from a metallic material such as stainless steel. Bottom member 18 will be discussed in more detail below.

A central aperture 26 is provided in upper casing 14 into which a port fitting 28 is secured preferably hermetically by a silver braze. Port fitting 28 permits attachment to a pressure zone which it is desired to monitor. Fluid enters valve 10 at a first end 30 of port fitting 28 and travels through a central passage 32 of the fitting and exits at a second end 34 into a central chamber 36 within housing 12.

A thin generally disc-shaped membrane member 38 divides chamber 36 into a first top portion 40 and a second bottom portion 42. Membrane 38 is preferably made from a resilient metallic material such as stainless steel having a thickness of approximately 0.001 of an inch. Adjacent membrane member 38 in the bottom portion 42 is a pressure disc member 44 with a central aperture 46 therethrough. Pressure disc 44 is shown as a monometallic member such as stainless steel although it may also be made from a bimetallic material. The disc is formed into a snap-acting concavo-convex disc by means known in the art; basically it involves forming a nondevelopable surface by permanently deforming the disc into a dished configuration. Preferably membrane member 38 if formed with the same dished or dome shape as pressure disc 44 so the two can be nested together. This dome shape allows the membrane to better follow the pressure disc and provides for better piercing of the membrane. The membrane is stretched by the permanent deforming to cause the domed shape. If the membrane is not deformed into this dished shape, part of piercing force is needed to stretch the membrane prior to proper piercing thus taking away from available piercing force which may inhibit proper piercing.

A calibration or support member 48 with a central aperture 51 may also be positioned in bottom portion 42 adjacent disc 44 on the opposite side of membrane 38 but bent away from the disc at its center portion to allow snap travel of the disc. The calibration member acts as a support member for the disc and membrane and aids in calibration of the device. Calibration member 48 along with membrane member 38 and pressure disc 44 are all hermetically secured at their periphery as by welding between flange portions 20 and 22 of upper and lower casing members 14 and 16. It is to be understood, although it is preferred that portion 20, membrane 38, disc 44, calibration member 48 and portion 22 be welded together at their marginal periphery that other means may be employed to clamp and seal the components between the upper and lower casing members.

Figure 2:
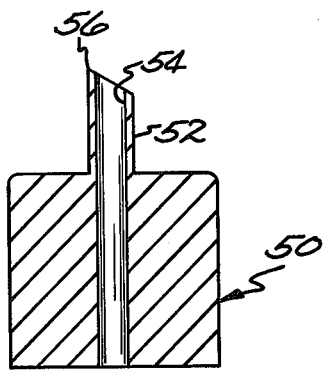
FIG. 2 is an enlarged cross-sectional view of a piercing member used in the relief valve of FIG. 1.

In accordance with this invention a piercing member 50 as best shown in FIG. 2 is securely anchored as by press fitting or threading in bottom member 18. Piercing member 50 may be made from a hardened stainless steel rod which is machined to reduce the diameter at one end yielding a piercing portion 52. Additionally a central axial aperture 54 is provided in member 50 with a diameter less than that of piercing portion 52. This aperture is used to vent the fluid from the pressure source to the atmosphere. To provide a piercing point 56 on piercing portion 52, preferably one end is beveled as shown in FIGS. 1 and 2. It is to be understood that other piercing means and configurations could equally well be used.

Bottom member 18 is secured in main portion 24 to form housing 12. The side wall of lower casing member 16 is rounded over at the bottom to hold member 18 in place. To properly locate and position member 18 in main portion 24, a side wall ridge 58 is provided to abut against calibration member 48. For providing more rapid fluid release apertures 60 and 62 may be provided in the bottom member. Preferably the member is made from brass or other suitable resilient material.

Rough calibration of the device is controlled by the dishing configuration of the snap-acting disc. The setting of the fine calibration is accomplished by placing the valve in a fixture and bending the welded flange portions 20 and 22 as required.

In operation valve 10 is connected to a pressure zone or source which it is desired to monitor. The fluid from the source enters chamber 36 through port fitting 28 and is maintained in top portion 40. The fluid exerts a force against the flexible membrane 38 directly and therefore, through the membrane, against the pressure disc 44. The pressure disc is formed with a specific domed or disc shaped configuration to provide snap-action at a specific pressure value. Typically the disc can be calibrated to operate with a tolerance range variation of less than plus or minus 1 psi. Upon the fluid pressure exceeding the predetermined pressure value the pressure disc snaps over center to an inverted disc shaped configuration. The piercing member anchored in the bottom of valve 10 is positioned to extend up through the central aperture in the pressure disc upon the snap action. The fluid pressure also causes membrane to follow the disc thereby piercing itself on the piercing member for venting the fluid pressure to the atmosphere.

Figure 1A:
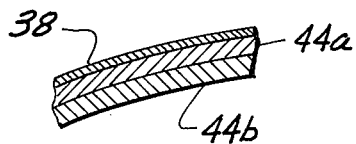
FIGS. 1a and 1b are cross-sectional broken away views of disc members useful in FIG. 1 valve.
Figure 1B:
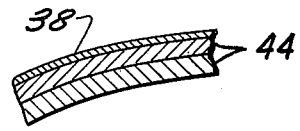

If a bimetallic pressure disc is employed in the device, as illustrated by layers 44a and 44b in FIG. 1a the device will respond to temperature as well as pressure. That is, the disc will snap through center when specific combinations of pressure and temperature conditions exist. Also as illustrated in FIG. 1b more than one pressure disc 44 can be used placed one on top of the other in nested relation to achieve higher pressure snap values.

It is to be understood that the invention is not limited in its application to the details of construction and arrangement of parts illustrated in the accompanying drawings, since the invention is capable of other embodiments and of being praticed or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings shall be interpreted as illustrative and not in a limiting sense and it is also intended that the appended claims shall cover all such equivalent variations as come within the true spirit and scope of the invention.

I claim:

1. A pressure responsive device comprising a housing with first and second casing members, said first casing member providing a first cavity and said second casing member providing a second cavity, a membrane positioned intermediate said first and second casing members, a pressure responsive snap-acting disc member positioned adjacent said membrane, said member formed with an aperture therethrough, said member substantially coextensive in area with said membrane, said membrane and said disc member being secured at their marginal periphery between said first and second casing members, said membrane separates and seals said first cavity from said second cavity, said disc member having a deformed portion therein responsible for its snap action, said first casing member providing an orifice communicating with said first cavity to admit fluid under pressure against one side of said membrane directly and through said membrane against said disc to effect snap action of said disc in response to said pressure in a direction toward said second casing member and piercing means securely mounted in said housing extending into said second cavity in axial registry with said aperture in said disc member to provide for piercing of said membrane during snap action of said disc to vent said pressure source.

2. A pressure responsive device as set forth in claim 1 wherein the securing of said membrane and pressure disc between said first and second casing members is by heliarc welding to provide a hermetic device.

3. A pressure responsive device as set forth in claim 2 wherein said piercing means is a rod which has a central aperture therethrough and a piercing point for breaking said membrane.

4. A pressure responsive device as set forth in claim 3 further including a support member adjacent said pressure disc on the opposite side from said membrane, said support member has a central aperture and is bent away from the disc at its center portion to allow snap travel of the disc.

5. A pressure responsive device as set forth in claim 4 wherein said membrane is metallic.

6. A pressure responsive device as set forth in claim 5 wherein said pressure disc is made from a bimetallic material.

7. A pressure responsive device as set forth in claim 5 wherein said device employs a plurality of pressure disc members.

* * * * *